United States Patent
Hu et al.

(10) Patent No.: US 8,792,839 B2
(45) Date of Patent: Jul. 29, 2014

(54) ALLOCATING TRANSMIT POWER AMONG MULTIPLE AIR INTERFACES

(75) Inventors: Jun Hu, San Diego, CA (US); Yu-Chuan Lin, Carlsbad, CA (US); Reza Shahidi, San Diego, CA (US); Vijaya C. Ramasami, San Diego, CA (US); Ravindra M. Garach, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 12/775,380

(22) Filed: May 6, 2010

(65) Prior Publication Data

US 2010/0291884 A1    Nov. 18, 2010

Related U.S. Application Data

(60) Provisional application No. 61/178,332, filed on May 14, 2009, provisional application No. 61/178,452, filed on May 14, 2009, provisional application No. 61/178,338, filed on May 14, 2009.

(51) Int. Cl.
*H01Q 11/12* (2006.01)

(52) U.S. Cl.
USPC ............... 455/127.1; 455/101; 455/127.5; 455/67.11; 455/343.1; 455/343.5; 455/13.4; 455/522; 455/574; 370/311

(58) Field of Classification Search
USPC .......... 455/127.1, 127.5, 67.11, 343.1, 343.3, 455/343.5, 13.4, 522, 574, 101; 370/311
See application file for complete search history.

(56) References Cited

U.S. PATENT DOCUMENTS

| | | | |
|---|---|---|---|
| 5,465,410 | A | 11/1995 | Hiben et al. |
| 5,590,156 | A | 12/1996 | Carney |
| 6,282,184 | B1 | 8/2001 | Lehman et al. |
| 6,333,926 | B1 | 12/2001 | Van Heeswyk et al. |
| 6,415,146 | B1 | 7/2002 | Capece |
| 6,999,759 | B2 | 2/2006 | Harris et al. |
| 7,187,923 | B2 | 3/2007 | Mousseau et al. |

(Continued)

FOREIGN PATENT DOCUMENTS

| | | |
|---|---|---|
| CN | 1759542 A | 4/2006 |
| CN | 1791276 A | 6/2006 |

(Continued)

OTHER PUBLICATIONS

International Search Report and Written Opinion—PCT/US2010/034010, International Search Authority—European Patent Office—Oct. 13, 2010

(Continued)

*Primary Examiner* — Junpeng Chen
(74) *Attorney, Agent, or Firm* — Eric Ho

(57) ABSTRACT

Systems and methods for allocating transmit power among multiple interfaces in a wireless communication system are disclosed. In one embodiment, the method comprises determining a first power level that is used for transmitting over a first air interface, determining a maximum power level available for transmitting over a second interface, comparing the first power level to the maximum power level, determining a second power level that is used for transmitting over the second air interface based on the comparison of the first power level to the maximum power level, and generating a power-based payload constraint based on the second power level.

25 Claims, 7 Drawing Sheets

(56) References Cited

U.S. PATENT DOCUMENTS

| | | |
|---|---|---|
| 7,426,648 B2 | 9/2008 | Lint et al. |
| 2002/0061031 A1 | 5/2002 | Sugar et al. |
| 2002/0080728 A1 | 6/2002 | Sugar et al. |
| 2002/0131396 A1 | 9/2002 | Knuutila et al. |
| 2003/0054788 A1 | 3/2003 | Sugar et al. |
| 2003/0152044 A1 | 8/2003 | Turner |
| 2004/0041538 A1 | 3/2004 | Sklovsky |
| 2004/0095903 A1 | 5/2004 | Ryan et al. |
| 2004/0203830 A1 | 10/2004 | Rudowicz et al. |
| 2005/0003848 A1 | 1/2005 | Chen et al. |
| 2006/0189346 A1 | 8/2006 | Turner et al. |
| 2006/0281486 A1 | 12/2006 | Ngai et al. |
| 2007/0041351 A1 | 2/2007 | Hazra et al. |
| 2007/0110197 A1 | 5/2007 | Bagchi et al. |
| 2007/0159399 A1 | 7/2007 | Perunka et al. |
| 2007/0232349 A1 | 10/2007 | Jones et al. |
| 2008/0004063 A1 | 1/2008 | Haapoja et al. |
| 2008/0058000 A1 | 3/2008 | Tanaka et al. |
| 2008/0117859 A1 | 5/2008 | Shahidi et al. |
| 2008/0151798 A1* | 6/2008 | Camp .......................... 370/311 |
| 2008/0253351 A1 | 10/2008 | Pernu et al. |
| 2008/0259833 A1 | 10/2008 | Ozturk et al. |
| 2008/0261540 A1 | 10/2008 | Rohani et al. |
| 2008/0285536 A1 | 11/2008 | Kaidar et al. |
| 2008/0287158 A1 | 11/2008 | Rayzman et al. |
| 2008/0311912 A1 | 12/2008 | Balasubramanian et al. |
| 2009/0093216 A1 | 4/2009 | Sun et al. |
| 2009/0103455 A1 | 4/2009 | Balasubramanian et al. |
| 2010/0130252 A1 | 5/2010 | Chishima et al. |
| 2010/0136975 A1 | 6/2010 | Onishi |
| 2010/0291882 A1 | 11/2010 | Hu et al. |
| 2010/0291966 A1 | 11/2010 | Hu et al. |
| 2011/0122972 A1 | 5/2011 | Lie et al. |

FOREIGN PATENT DOCUMENTS

| | | |
|---|---|---|
| CN | 1881821 A | 12/2006 |
| CN | 1980421 A | 6/2007 |
| EP | 1727291 | 11/2006 |
| FR | 2920063 | 2/2009 |
| JP | 2005012815 A | 1/2005 |
| JP | 2007274537 A | 10/2007 |
| JP | 2008061014 A | 3/2008 |
| JP | 2008136137 A | 6/2008 |
| JP | 2008172450 A | 7/2008 |
| JP | 2008244989 A | 10/2008 |
| JP | 2008252395 A | 10/2008 |
| JP | 2008545295 A | 12/2008 |
| JP | 2009005195 A | 1/2009 |
| JP | 2009060250 A | 3/2009 |
| JP | 2009065307 A | 3/2009 |
| JP | 2009532965 A | 9/2009 |
| WO | WO0051376 | 8/2000 |
| WO | WO03009557 | 1/2003 |
| WO | WO2006038085 | 4/2006 |
| WO | 2007113319 A1 | 10/2007 |

OTHER PUBLICATIONS

International Search Report and Written Opinion—PCT/US2010/034018, International Search Authority—European Patent Office—Aug. 17, 2010.

International Search Report and Written Opinion—PCT/US2010/034024, International Search Authority—European Patent Office—Aug. 2, 2010.

International Search Report and Written Opinion—PCT/US2010/034951, International Search Authority—European Patent Office—Oct. 25, 2010.

* cited by examiner

ALLOCATING TRANSMIT POWER AMONG MULTIPLE AIR INTERFACES

CROSS-REFERENCE TO RELATED APPLICATIONS

This application claims priority under §119(e) to the following U.S. Provisional Applications: (1) U.S. Prov. App. No. 61/178,332, entitled "System and method for resolving conflicts between air interfaces in a wireless communication system," filed May 14, 2009; (2) U.S. Prov. App. No. 61/178,452, entitled "Allocating transmit power among multiple air interfaces," filed May 14, 2009; and (3) U.S. Prov. Appl. No. 61/178,338, entitled "System and method for dropping and adding an air interface in a wireless communication system," filed May 14, 2009. The above-referenced applications are herein incorporated by reference in their entirety.

BACKGROUND OF THE INVENTION

1. Field of the Invention

The invention generally relates to communication networks and systems. In particular, the invention relates to systems and methods for allocating power among multiple air interfaces for a mobile device supporting simultaneous transmission using multiple air interfaces.

2. Description of the Related Art

Many forms of wireless communication systems and networks are used to transmit various forms of data including, but not limited to, voice, video, multimedia, and packet data. In some cases a mobile device that communicates on such a network supports transmission over multiple air interfaces (e.g., 1x, 1xAdvanced, DO, UMTS (HSPA+), GSM, GPRS, EDGE, etc.). In the related art, mobile devices only transmit over one air interface at a time. Therefore, power allocation in the related art only deals with allocating power to a single air interface at a time. Therefore, the related art does not describe power allocation between multiple air interfaces where a mobile device transmits on multiple air interfaces simultaneously. Thus, it is desirable to provide an efficient power allocation strategy for mobile devices that transmit on multiple air interfaces simultaneously.

SUMMARY OF THE INVENTION

The systems, methods, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include concurrent communication over multiple air interfaces.

One aspect of the disclosure is a method for allocating power among multiple air interfaces for a communication device supporting simultaneous transmission over multiple air interfaces, the method comprising determining a first power level that is used for transmitting over a first air interface, determining a second power level available for transmitting over a second interface, comparing the first power level to the second power level available for transmitting over a second interface, determining an estimated second power level for transmitting over the second air interface based on the comparison of the first power level to the second power level, and generating a power-based payload constraint based on at least the estimated second power level.

Another aspect of the disclosure is a wireless communication device supporting simultaneous transmission on multiple air interfaces, the wireless communication device comprising a first interface power level calculator configured to determine a first power level that is used for transmitting over a first air interface, a second interface power level calculator configured to determine a second power level available for transmitting over a second interface, a differential check unit configured to compare the first power level to the second power level available for transmitting over a second interface, a second interface power level adjuster configured to determine an estimated second power level for transmitting over the second air interface based on the comparison of the first power level to the second power level, and a power-based payload constraint calculator configured to generate a power-based payload constraint based on at least the estimated second power level.

Another aspect of the disclosure is a system for allocating power among multiple air interfaces for a communication device supporting simultaneous transmission over multiple air interfaces, the system comprising means for determining a first power level that is used for transmitting over a first air interface, means for determining a second power level available for transmitting over a second interface, means for comparing the first power level to the second power level available for transmitting over a second interface, means for determining an estimated second power level for transmitting over the second air interface based on the comparison of the first power level to the second power level, and means for generating a power-based payload constraint based on at least the estimated second power level.

Another aspect of the disclosure is a computer program product, comprising, computer-readable medium comprising code for causing a computer to determine a first power level that is used for transmitting over a first air interface, code for causing a computer to determine a second power level available for transmitting over a second interface, code for causing a computer to compare the first power level to the second power level available for transmitting over a second interface, code for causing a computer to determine an estimated second power level for transmitting over the second air interface based on the comparison of the first power level to the second power level, and code for causing a computer to generate a power-based payload constraint based on at least the estimated second power level.

DETAILED DESCRIPTION OF CERTAIN EMBODIMENTS

Figure 1:
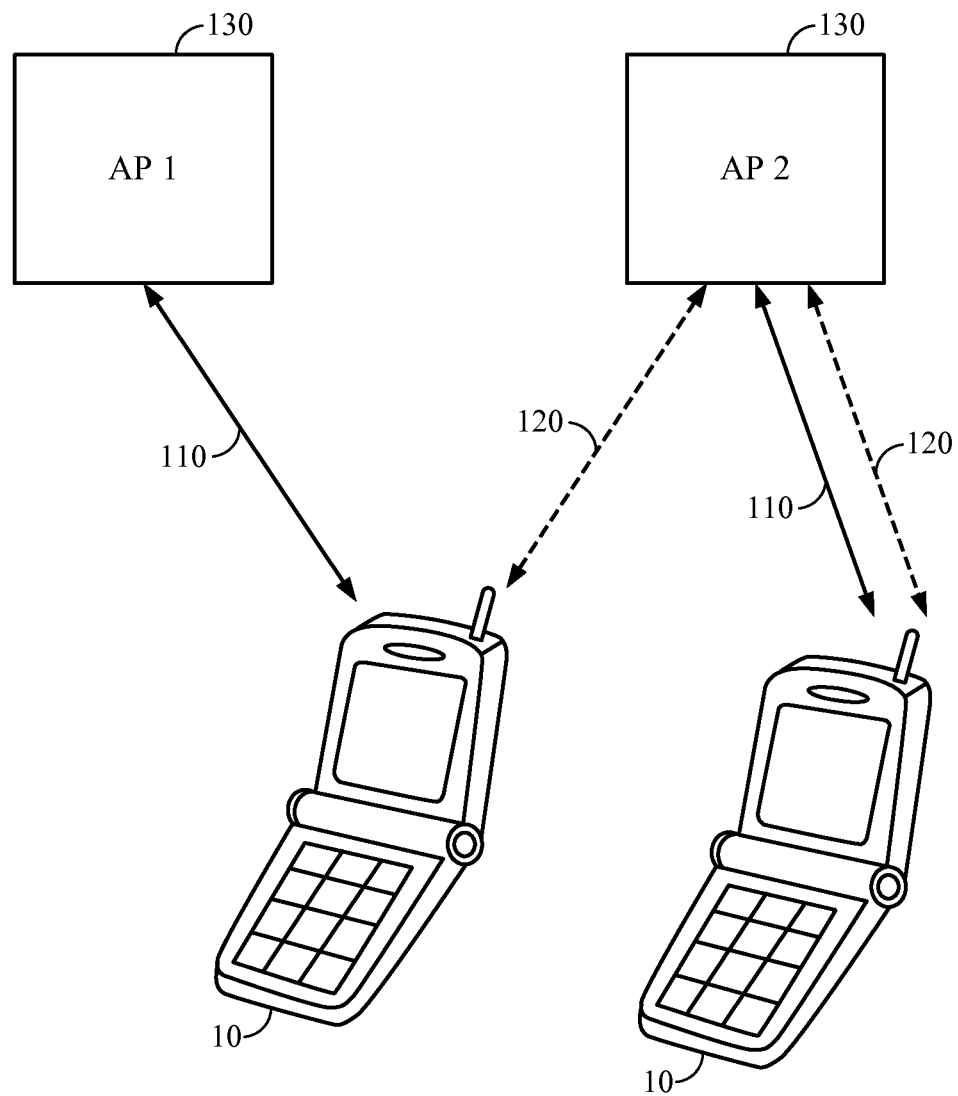
FIG. 1 is a diagram illustrating wireless communication devices engaged in simultaneous communication over two air interfaces.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Methods and devices described herein are related to allocating transmit power among multiple air interfaces at a wireless communication device. The described embodiments are related to wireless communication devices that transmit over two air interfaces. However, one of ordinary skill in the art will recognize that similar methods and devices may be used to support transmission over more than two air interfaces.

Some embodiments of wireless communication devices described herein are configured to transmit over multiple air interfaces simultaneously. Each air interface may correspond to a different communication standard. Accordingly co-channels or channels using a single communication standard do not correspond to different air interfaces. For example, a wireless communication device may communicate voice over a first air interface (e.g., 1x) and data only over a second air interface (e.g., DO). Transmitting the voice over the first interface may require the voice signal be amplified to a first power level. The first power level may be chosen in order to maintain a certain level of voice quality. A higher power level may correspond to a stronger signal sent by the wireless communication device. The stronger signal may be less susceptible to errors and therefore results in a higher quality received voice signal (e.g., less noise).

Further, transmitting data over the second interface may require the data signal be amplified to a second power level. The second power level may be chosen in order to maintain a certain transmission data rate. A higher power level may correspond to a stronger signal sent by the wireless communication device. The stronger signal may be less susceptible to errors and therefore more data and less error-correcting bits may be sent over the communication channel.

Accordingly, higher transmit power levels for each air interface may be beneficial. However, the wireless communication device may be constrained to an overall power level available for transmission over both the first and second air interfaces. The overall power level may be constrained by factors such as interference between the air interfaces and/or other devices and minimization of battery power consumption. Accordingly, methods and devices for allocating the overall power level between multiple air interfaces are described below. The overall power level available may be a static constraint or may change dynamically.

Transmission over the multiple air interfaces may be divided into frames or subframes. Accordingly, in some embodiments the methods described herein may be used to allocate power between multiple air interfaces for each frame or subframe individually. In other embodiments, the methods may be used to allocate power for multiple frames or subframes.

FIG. 1 is a diagram illustrating wireless communication devices engaged in simultaneous communication over two air interfaces. Each wireless communication device 10 can simultaneously establish a first air interface 110 and a second air interface 120 between itself and an access point 130. In one embodiment, the first air interface 110 is established at a first channel defined by a first frequency or frequency band, whereas the second air interface 120 is established at a second channel defined by a second frequency or frequency band which is different from the first frequency or frequency band. In one embodiment, the first air interface 110 and the second air interface 120 are both established with the same access point 130. In another embodiment, the first air interface 110 and the second air interface 120 are each established with a different access point 130. Each of the access points 130 may be located in a different geographical location. Further, in one embodiment control of the two air interfaces is done completely at the wireless communication device 10. Accordingly, there is no interaction between the air interfaces at the access point 130. The lack of interaction at the access points 130 means that the access points 130 do not control one air interface based on metric of another air interface. In yet another embodiment, the only control that the wireless communication device 10 exerts over one air interface based on another air interface is power level control based which may be based on performance metrics of each air interface.

In some embodiments, the wireless communication device 10 may have an access state and a traffic state for each air interface 110 and 120. When a given air interface 110 or 120 is in an access state, the wireless communication device 10 does not actively transmit or receive data over the given air interface 110 or 120. In the access state, the wireless device 10 may wait for a message. Upon receiving the message from either an external device or internally, the wireless communication device 10 air interface 110 or 120 may enter a traffic state. In a traffic state, the wireless communication device 10 actively transmits or receives data over the given air interface device 110 or 120.

In one embodiment, the first air interface 110 supports 1xRTT traffic and the second air interface 120 supports EVDO traffic. 1xRTT, also known as 1x, 1xRTT, and IS-2000, is an abbreviation of 1 times Radio Transmission Technology. EVDO, abbreviated as EV or DO, is an abbreviation of Evolution-Data Only. Both 1xRTT and EVDO are telecommunications standards for the wireless transmission of data through radio signals maintained by 3GPP2 ($3^{rd}$ Generation Partnership Project), which are considered types of CDMA2000 (Code Division Multiple Access 2000).

In other embodiments, the first air interface 110 or the second air interface 120 can support 1xAdvanced, DO (Release 0, Revision A or B), UMTS (HSPA+), GSM, GPRS, and EDGE technologies.

Figure 2:
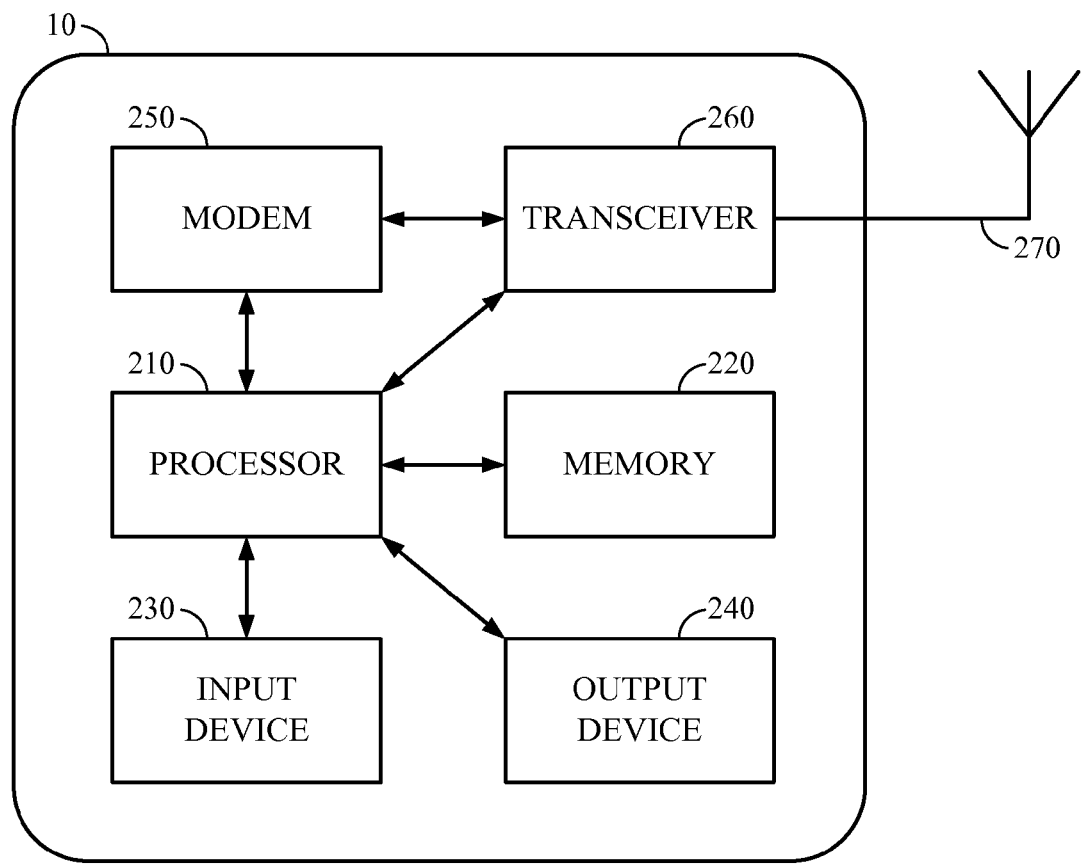
FIG. 2 is a functional block diagram of a wireless communication device.

FIG. 2 is a functional block diagram of a wireless communication device. The wireless communication device 10 includes a processor 210 in data communication with a memory 220, an input device 230, and an output device 240. The processor is further in data communication with a modem 250 and a transceiver 260. The transceiver 260 is also in data communication with the modem 250 and an antenna 270. Although described separately, it is to be appreciated that functional blocks described with respect to the wireless communication device 10 need not be separate structural elements. For example, the processor 210 and memory 220 may be embodied in a single chip. Similarly, two or more of the processor 210, modem 250, and transceiver 260 may be embodied in a single chip.

The processor 210 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 210 can be coupled, via one or more buses, to read information from or write information to memory 220. The processor may additionally, or in the alternative, contain memory, such as processor registers. The memory 220 can include processor cache, including a multi-level hierarchical cache in which different levels have different capacities and access speeds. The memory 220 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 210 is also coupled to an input device 230 and an output device 240 for, respectively, receiving input from and providing output to, a user of the wireless communication device 10. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 210 is further coupled to a modem 250 and a transceiver 260. The modem 250 and transceiver 260 prepare data generated by the processor 210 for wireless transmission via the antenna 270 according to one or more air interface standards. The modem 250 and transceiver 260 also demodulate data received via the antenna 270 according to one or more air interface standards. The transceiver can include a transmitter, receiver, or both. In other embodiments, the transmitter and receiver are two separate components. The modem 250 and transceiver 260, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 3:
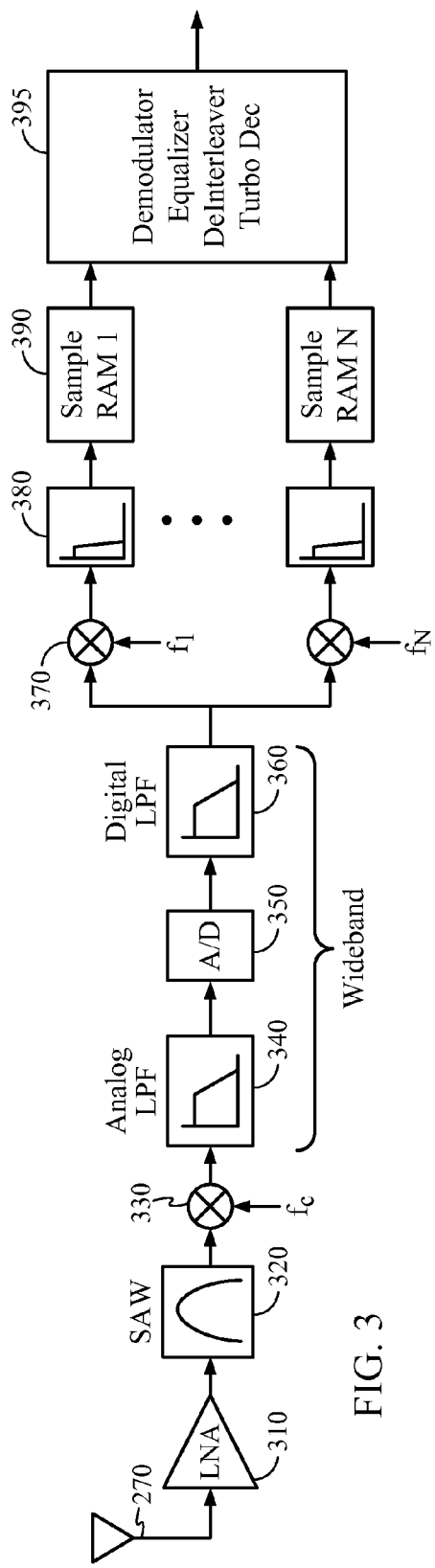
FIG. 3 is a functional block diagram of a receiver of a wireless communication device.

FIG. 3 is a functional block diagram of a receiver of a wireless communication device. A signal received on the antenna 270 is amplified by a low-noise amplifier 310. Depending on the particular embodiment, the amplified signal then passes through a SAW (surface acoustic wave) filter 320. A SAW filter is an electromechanical device in which electrical signals are converted into a mechanical wave in a device constructed of a piezoelectric crystal or ceramic. The mechanical wave is delayed as it propagates across the device before being converted back into an electric signal by electrodes. The delayed outputs are recombined to produce a direct analog implementation of a finite impulse response filter. The signal is then multiplied by a center frequency at a multiplier 330. The base-banded signal is then passed through an analog low-pass filter 340, converted to a digital signal at an analog-to-digital converter 350, and filtered once again with a digital low-pass filter 360.

The signal is then split into multiple paths. Each path is multiplied by a different frequency at a multiplier 370 and passed through an appropriate filter 380 before being sampled with a sampler 390. Further processing, including demodulation, equalization, deinterleaving, and error correction coding, can be performed in a processing module 395 or the modem 250 or processor 210 of FIG. 2.

Figure 4:
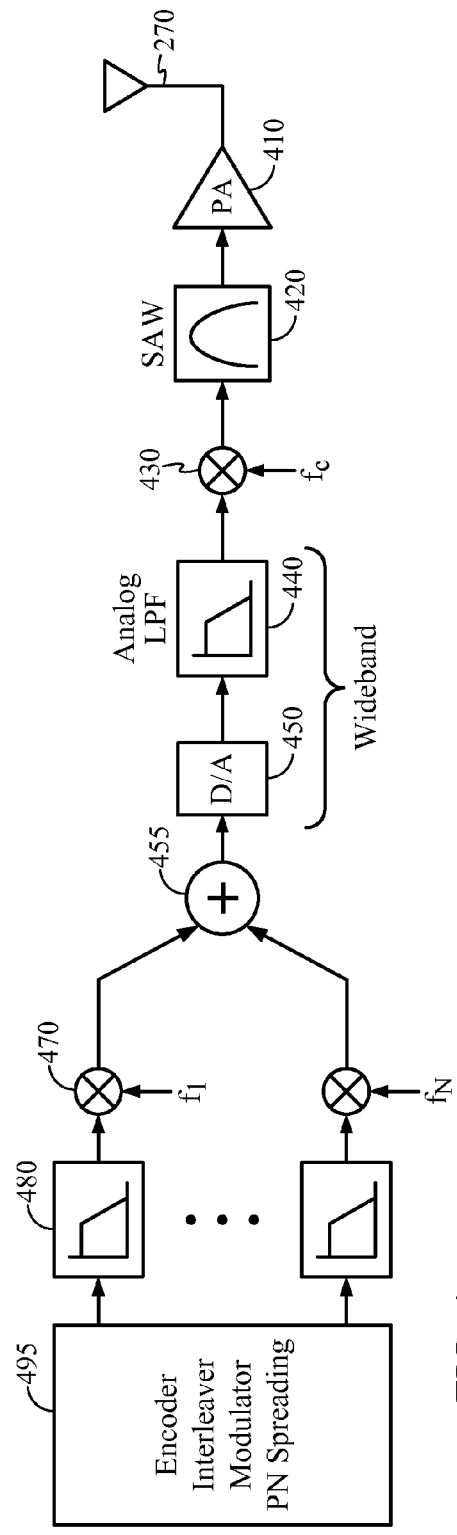
FIG. 4 is a functional block diagram of a transmitter of a wireless communication device.

FIG. 4 is a functional block diagram of a transmitter of a wireless communication device. The function of the transmitter is similar to that of the receiver, but in reverse. In particular, data generated by the processor 210 of FIG. 2 may be subject to preliminary processing in a processing module 495, the modem 250, or the processor 210 itself. The data for each channel is passed through an appropriate filter 480 before being modulated at a multiplier 470. The modulated carriers are added together at an adder 455 before being converted into an analog signal at a digital-to-analog converter 450. The analog signal is passed through an analog low-pass filter 440 before being modulated to a center frequency at a multiplier 430. The modulated signal is optionally passed through a SAW filter 420 and a power amplifier 410 before being transmitted via the antenna 270.

Figure 5:
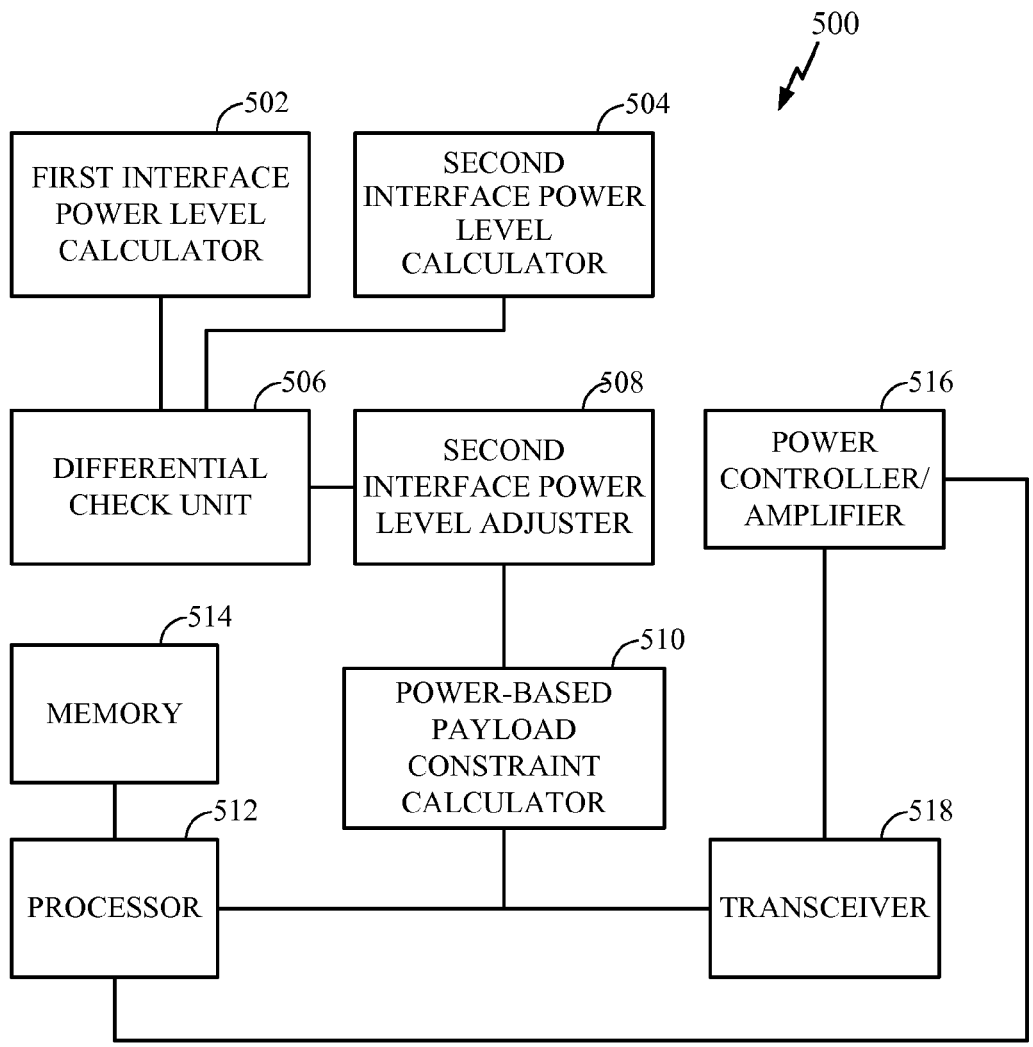
FIG. 5 illustrates one embodiment of a functional block diagram of a wireless communication device.

FIG. 5 illustrates one embodiment of a functional block diagram of a wireless communication device. In some embodiments, the various blocks may be implemented as software and/or firmware. The wireless communication device 500 includes a first interface power level calculator 502. In one embodiment, the first interface power level calculator calculates a first power level chosen for transmitting over the first air interface. Wireless communication device 500 may also include a second interface power level calculator 504 configured to calculate a maximum available power level for transmitting over the second air interface (e.g., the total power for transmitting over both air interfaces (which may be a static or dynamic constraint) minus the power used to transmit over the first air interface). Both first interface power level calculator 502 and second interface power calculator 504 may be in data communication with differential check unit 506. Differential check unit 506 may determine whether the maximum available power level for transmitting over the second interface differs from the first interface power level for transmitting over the first interface by a power differential threshold. The power differential threshold may be static or dynamically configured.

Accordingly, in one embodiment differential check unit 506 may first determine the difference between the maximum available power level for transmitting over the second interface and the first interface power level. Differential check unit 506 may then compare the calculated difference to the power differential threshold. If the calculated difference is greater than the threshold, the differential check unit 506 may signal a second interface power level adjuster 508 to determine a transmit power for the second air interface as discussed with respect to FIG. 7. If the calculated difference is less than the threshold, the differential check unit 506 may signal the second interface power level adjuster 508 to set the transmit power for the second air interface to the maximum available power level for transmitting over the second interface as discussed with respect to FIG. 7. In some embodiments, the transmit power differential between the first air interface and the second air interface may be controlled to an acceptable level. The actual level may depend on the specific RF implementation of each air interface. Differential check unit 506 may be in data communication with second interface power level adjuster 508. Second power level adjuster 508 may estimate a power level for transmitting over the second air interface as discussed with respect to FIG. 7.

Second power level adjuster 508 may be in data communication with power-based payload constraint calculator 510. Power-based payload constraint calculator 510 may generate a power-based payload constraint (e.g., power allocation (PA) headroom) based on certain factors described below. The power-based payload constraint calculator 510 may be in data communication with processor 512 and transceiver 518. Processor 512 may be in data communication with memory 514 and power controller/amplifier 516. Power controller/amplifier 516 may be in data communication with transceiver 518. In some embodiments, processor 512 may be similar to processor 210, memory 514 may be similar to memory 220, and transceiver 518 may be similar to transceiver 260. Power controller/amplifier 516 may allocate power levels to each air interface.

It should be noted that other embodiments of a wireless communication device may include additional modules or may not include all of the modules shown in FIG. 5.

Figure 6:
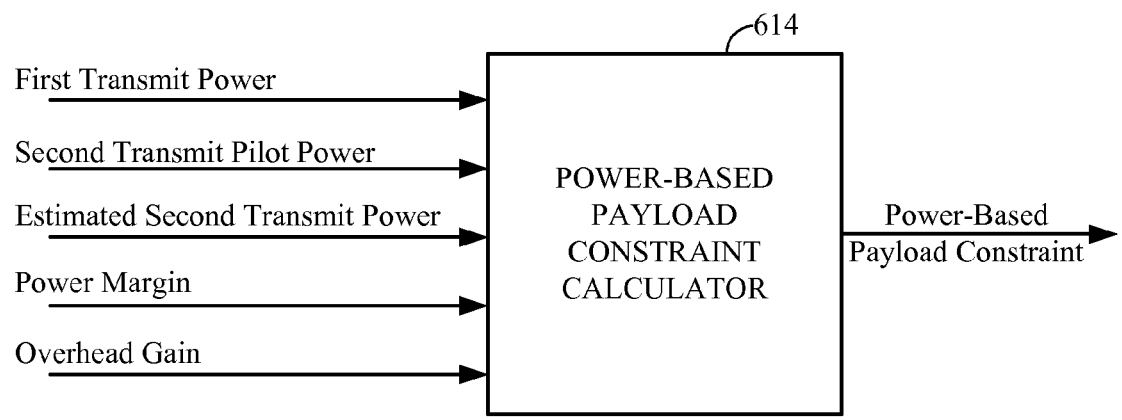
FIG. 6 illustrates the input and output of one embodiment of a power-based payload constraint calculator.

FIG. 6 further illustrates the input and output of one embodiment the power-based payload constraint calculator of FIG. 5. Power-based payload constraint calculator 614 may generate a power-based payload constraint according to methods described with respect to FIG. 7. Power-based payload constraint calculator 614 may take in one or more inputs. For example, power-based payload constraint calculator 614 may receive as input a first transmit power, which corresponds to the transmit power level chosen for the first air interface. Power-based payload constraint calculator 614 may also receive as input a second transmit pilot power (e.g., peak pilot or instantaneous pilot), which corresponds to the power required to transmit a pilot of a carrier of the second air interface. In addition, power-based payload constraint calculator 614 may receive as input an estimated second transmit power for transmitting over the second air interface. Further, power-based payload constraint calculator 614 may receive as input a power margin corresponding to a calculated margin for transmitting the pilot of the carrier of the second air interface. In some embodiments, the power margin may be a fixed value. In other embodiments, the power margin may be adjusted. One such embodiment is described with respect to FIG. 8. An overhead gain may also be input into power-based payload constraint calculator 614, wherein the overhead gain is the required overhead power to transmit the pilot of the carrier of the second air interface. Based on one or more inputs, power-based payload constraint calculator 614 may calculate a power-based payload constraint that is used to allocate power between multiple air interfaces. It should be noted that other inputs may be input into power-based payload constraint calculator 614 that are similar to the inputs described in order to calculate the power-based payload constraint.

Figure 7:
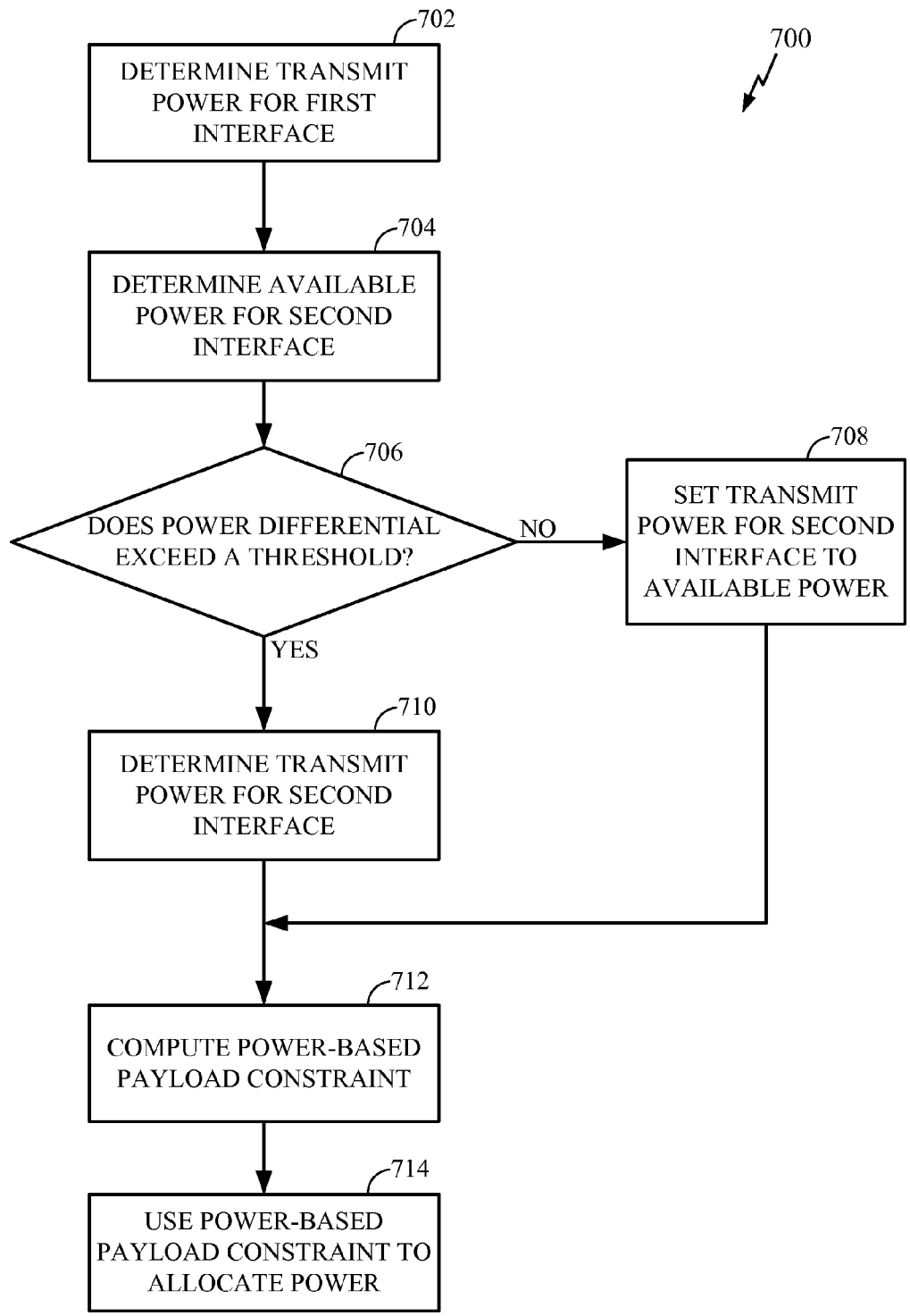
FIG. 7 illustrates a flowchart of a process of calculating a power-based payload constraint.

FIG. 7 illustrates a flowchart of a process 700 of calculating a power-based payload constraint and using the power-based payload constraint to allocate power. In some embodiments, the steps of process 700 may be performed by various components of wireless communication device 500. The following description is just one embodiment of process 700 described with respect to one embodiment of wireless communication device 500. It should be noted that process 700 may be performed by other wireless communication devices and the steps of process 700 may be performed by components other than those described below.

At a step 702, first interface power level calculator 502 determines the first power level chosen for transmitting over the first air interface. In some embodiments, the power level chosen for transmitting over the first air interface may be the power level at which transmission is already occurring over the first air interface. In some such embodiments, the chosen power level for transmitting over the first air interface may be retrieved from memory 512. The first interface power level calculator 502 may also apply an IIR filter (e.g., 1-tap IIR filter with a selected time constraint (e.g., 1 frame)) to the retrieved power level. The filter may be set based on a mode of the first air interface (e.g., 1xAdvanced mode of the 1x air interface). The filter may be reset when the first air interface leaves the traffic state.

Further at a step 704, second interface power level calculator 504 calculates a maximum available power level for transmitting over the second air interface. In one embodiment, the maximum available power level for transmitting over the second air interface may be retrieved from memory 512. In other embodiments, the maximum available power level for transmitting over the second air interface may be calculated as the difference between a total power available to wireless communication device 500 for transmitting over the first air interface and the second air interface, and the first power level determined at step 702.

At a next step 706, the differential check unit 506 may determine whether the maximum available power level for transmitting over the second interface differs from the first interface power level for transmitting over the first interface by at least a power differential threshold. If they do not differ by a power differential threshold, process 706 continues to a step 708. At step 708 the second power level adjuster 508 sets an estimated power level for transmitting over the second air interface to the difference between the maximum available power level for transmitting over the second interface and the first interface power level for transmitting over the first interface. The process then continues to step 712.

If at step 706 it is determined the maximum available power level for transmitting over the second interface does differ from the first interface power level for transmitting over the first interface by at least a power differential threshold, the process continues to step 710. At step 710 the second power level adjuster 508 sets the estimated power level for transmitting over the second air interface such that the difference between the estimated power level for transmitting over the second air interface and the first interface power level for transmitting over the first interface does not exceed the power differential threshold. The process then continues to step 712.

At step 712, the power-based payload constraint is calculated. In one embodiment, the estimated power available for transmitting data traffic over the second air interface is first calculated as the difference between: the estimated power level for transmitting over the second air interface; and the second transmit pilot power adjusted for the overhead gain and the power margin. The power-based payload constraint is then calculated as the estimated power available for transmitting data traffic over the second air interface adjusted for the second transmit pilot power and the power margin. The process 700 then continues to step 714. At step 714, the processor 512 uses the power-based payload constraint to allocate power to the first air interface and the second air interface. The power-based payload constraint is indicative of the power level chosen for transmission over the second air interface. Embodiments of power allocation schemes are described below.

In some embodiments, the first air interface is the preferred air interface. In some such embodiments, the allocation of resources for the first air interface may take priority over the second air interface. For example, the allocation of power to the first air interface may not be limited. In other words, if the composite of the chosen power levels for transmission over the first air interface and the second air interface exceeds the overall power available, the first air interface will be allocated power before the second air interface is allocated power. The second air interface will be allocated any power that remains after the first air interface is allocated power. Therefore, if the chosen power level for the first air interface is X W, the chosen power level for the second air interface is Y W, and the overall power available is Z W, the power is allocated as follows. If $X+Y \leq Z$, then the first air interface may be allocated X W, and the second air interface may be allocated Y W. If $X+Y>Z$ and $X<Z$, then the first air interface may be allocated X W, and the second air interface may be allocated Z−X W. Further, if $X+Y>Z$ and $X \geq Z$, then the first air interface may be allocated the entire Z W available.

Other priority schemes for allocating resources may be used as well. For example, the allocation of power to the first air interface may be prioritized from 0 W to A W. Further, the total transmit power available may be Z W. Accordingly, the first air interface is allocated power before the second air interface up to A W. The second air interfaces may then be allocated power up to Z W—the number of watts used allocated to the first air interface. Any unallocated power may be used to fulfill the remaining power allocation, if any, requested by the first air interface. For example, the chosen power level for the first air interface may be X W, where X>A. The chosen power level for the second air interface may be Y W. If $X+Y>Z$ and $A+Y>Z$, then the first air interface is allocated A W and the second air interface is allocated Z−A W. If $X+Y>Z$ and $A+Y<Z$, then the first air interface is allocated Z−Y W and the second air interface is allocated Y W. If $X+Y>Z$ and $X<Z$, then the first air interface may be allocated X W, and the second air interface may be allocated Z−X W. One of ordinary skill in the art will recognize other schemes may be used as well, such as several priority levels for allocating power (e.g., the first air interface is prioritized for the first A W, the second air interface for the next B W, the first air interface for the next C W, etc.).

Figure 8:
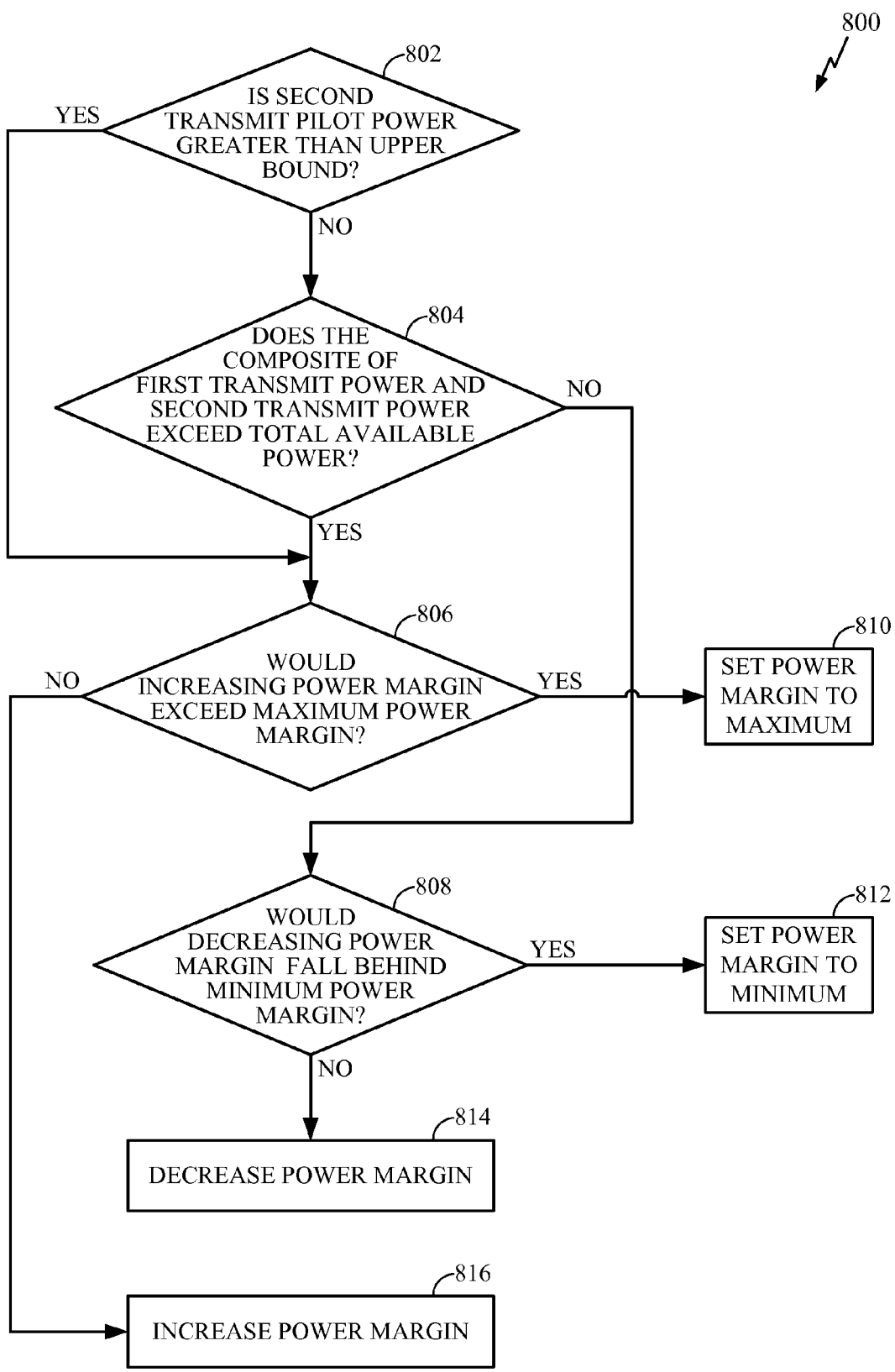
FIG. 8 illustrates a flowchart of a process of adjusting the power margin using a margin loop.

FIG. 8 illustrates a flowchart of a process 800 of adjusting the power margin using a margin loop. At step 802 it is determined if the second transmit pilot power is greater than an upper bound for the transmit pilot power. The upper bound may be predetermined. If it is determined the pilot power is greater than the upper bound, process 800 continues to step 806. If it is determined the pilot power is not greater than the upper bound, process 800 continues to step 804. At step 804 it is determined if the composite of the chosen power levels for transmission over the first air interface and the second air interface exceeds the overall power available. If it is determined the composite exceeds the overall power available, the process continues to step 806. If it is determined the composite does not exceed the overall power available, the process continues to step 808.

At step 806, the power margin is compared to a maximum power margin. The maximum power margin may be predetermined. If increasing the power margin would cause the power margin to exceed the maximum power margin, process 800 continues to step 810 where the power margin is set to the maximum power margin. If it is determined increasing the power margin would not cause the power margin to exceed the maximum power margin, process 800 continues to step 816, where the power margin is increased by an amount. In some embodiments, the increase interval is predetermined.

At step 808, the power margin is compared to a minimum power margin. The minimum power margin may be predetermined. If decreasing the power margin would cause the power margin to fall behind the minimum power margin, process 800 continues to step 812 where the power margin is set to the minimum power margin. If it is determined decreasing the power margin would not cause the power margin to fall behind the minimum power margin, process 800 continues to step 814, where the power margin is decreased by an amount. In some embodiments, the decrease interval is predetermined. The increase interval, decrease interval, maximum power margin, and/or minimum power margin may be based on the types of air interfaces used by the wireless communication device.

While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for allocating power among multiple air interfaces for a communication device supporting simultaneous transmission over multiple air interfaces, the method comprising:
   determining a first power level that is used for transmitting over a first air interface;
   determining an available power level for transmitting over a second air interface;
   comparing a difference between the available power level and the first power level to a power differential threshold;
   setting a second power level for transmitting over the second air interface to the available power level in response to a determination that the difference between the available power level and the first power level fails to exceed the power differential threshold;
   setting the second power level for transmitting over the second air interface to an adjusted power level in response to a determination that the difference between the available power level and the first power level exceeds the power differential threshold, wherein a difference between the adjusted power level and the first power level fails to exceed the power differential threshold; and
   generating a power-based payload constraint based on at least the second power level.

2. The method of claim 1, further comprising allocating power to the first air interface and to the second air interface based on the power-based payload constraint.

3. The method of claim 2, wherein the power allocated to the first air interface is prioritized over the power allocated to the second air interface.

4. The method of claim 2, wherein the power allocated to the first air interface is prioritized over the power allocated to the second air interface up to a priority power level, and wherein the power allocated to the second air interface is prioritized over the power allocated to the first air interface from a range between the priority power level and a total available power.

5. The method of claim 4, wherein the total available power corresponds to a sum of the first power level and the available power level.

6. The method of claim 1, wherein generating the power-based payload constraint is further based on a power margin, an overhead gain, and a transmit pilot power for transmitting a pilot over the second air interface.

7. The method of claim 1, further comprising adjusting a power margin based on a transmit pilot power.

8. The method of claim 7, further comprising adjusting the power margin based on a total transmit power.

9. A wireless communication device supporting simultaneous transmission over multiple air interfaces, the wireless communication device comprising:
   a first interface power level calculator configured to determine a first power level that is used for transmitting over a first air interface;
   a second interface power level calculator configured to determine an available power level for transmitting over a second air interface;
   a differential check unit configured to compare a difference between the available power level and the first power level to a power differential threshold;

a second interface power level adjuster configured to:
  set a second power level for transmitting over the second air interface to the available power level in response to a determination that the difference between the available power level and the first power level fails to exceed the power differential threshold; and
  set the second power level for transmitting over the second air interface to an adjusted power level in response to a determination that the difference between the available power level and the first power level exceeds the power differential threshold, wherein a difference between the adjusted power level and the first power level fails to exceed the power differential threshold; and
a power-based payload constraint calculator configured to generate a power-based payload constraint based on at least the estimated second power level.

10. The device of claim 9, further comprising a power controller configured to allocate power to the first air interface and to the second air interface based on the power-based payload constraint.

11. The device of claim 10, wherein the power allocated to the first air interface is prioritized over the power allocated to the second air interface.

12. The device of claim 10, wherein the power allocated to the first air interface is prioritized over the power allocated to the second air interface up to a priority power level, and wherein the power allocated to the second air interface is prioritized over the power allocated to the first air interface from a range between the priority power level and a total available power.

13. The device of claim 12, wherein the total available power corresponds to a sum of the first power level and the available power level.

14. The device of claim 9, wherein the power-based payload constraint calculator is further configured to generate the power-based payload constraint based on a power margin, an overhead gain, and a transmit pilot power for transmitting a pilot over the second air interface.

15. The device of claim 9, further comprising a processor configured to adjust a power margin based on a transmit pilot power.

16. The device of claim 15, further comprising a processor configured to adjust the power margin based on a total transmit power.

17. A system for allocating power among multiple air interfaces for a communication device supporting simultaneous transmission over multiple air interfaces, the system comprising:
  means for determining a first power level that is used for transmitting over a first air interface;
  means for determining an available power level for transmitting over a second air interface;
  means for comparing a difference between the available power level and the first power level to a power differential threshold;
  means for setting a second power level for transmitting over the second air interface, wherein the second power level is set to the available power level in response to a determination that the difference between the available power level and the first power level fails to exceed the power differential threshold, wherein the second power level is set to an adjusted power level in response to a determination that the difference between the available power level and the first power level exceeds the power differential threshold, and wherein a difference between the adjusted power level and the first power level fails to exceed the power differential threshold; and
  means for generating a power-based payload constraint based on at least the estimated second power level.

18. The system of claim 17, further comprising means for allocating power to the first air interface and to the second air interface based on the power-based payload constraint.

19. The system of claim 18, wherein the power allocated to the first air interface is prioritized over the power allocated to the second air interface.

20. The system of claim 18, wherein the power allocated to the first air interface is prioritized over the power allocated to the second air interface up to a priority power level, and wherein the power allocated to the second air interface is prioritized over the power allocated to the first air interface from a range between the priority power level and a total available power.

21. The system of claim 20, wherein the total available power corresponds to a sum of the first power level and the available power level.

22. The system of claim 17, wherein the means for generating the power-based payload constraint is further configured to generate the power-based payload constraint based on a power margin, an overhead gain, and a transmit pilot power for transmitting a pilot over the second air interface.

23. The system of claim 17, further comprising means for adjusting a power margin based on a transmit pilot power.

24. The system of claim 23, further comprising means for adjusting the power margin based on a total transmit power.

25. A computer-readable storage device comprising:
  code for causing a computer to determine a first power level that is used for transmitting over a first air interface;
  code for causing the computer to determine an available power level for transmitting over a second air interface;
  code for causing the computer to compare a difference between the available power level and the first power level to a power differential threshold;
  code for causing the computer to set a second power level for transmitting over the second air interface to the available power level in response to a determination that the difference between the available power level and the first power level fails to exceed the power differential threshold;
  code for causing the computer to set the second power level for transmitting over the second air interface to an adjusted power level in response to a determination that the difference between the available power level and the first power level exceeds the power differential threshold, wherein a difference between the adjusted power level and the first power level fails to exceed the power differential threshold; and
  code for causing the computer to generate a power-based payload constraint based on at least the second power level.

* * * * *